(12) United States Patent
Quenzer et al.

(10) Patent No.: US 7,716,950 B2
(45) Date of Patent: May 18, 2010

(54) METHOD FOR PRODUCING SINGLE MICROLENSES OR AN ARRAY OF MICROLENSES

(75) Inventors: Hans Joachim Quenzer, Itzehoe (DE); Peter Merz, Hanerau-Hademarschen (DE); Uwe Bott, Hanerau-Hademarschen (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 1240 days.

(21) Appl. No.: 10/551,285

(22) PCT Filed: Mar. 22, 2004

(86) PCT No.: PCT/EP2004/002993

§ 371 (c)(1),
(2), (4) Date: Sep. 27, 2005

(87) PCT Pub. No.: WO2004/085323

PCT Pub. Date: Oct. 7, 2004

(65) Prior Publication Data

US 2006/0219653 A1    Oct. 5, 2006

(30) Foreign Application Priority Data

Mar. 27, 2003    (DE) .................. 103 13 889

(51) Int. Cl.
*B29D 11/00* (2006.01)

(52) U.S. Cl. ............ 65/39; 65/37; 65/41; 65/47; 65/102; 65/103; 65/110; 438/29

(58) Field of Classification Search ............ 65/107, 65/374.1, 289, 166, 37, 41, 44, 63, 62, 93–95, 65/102, 104, 273; 264/316, 299, 300
See application file for complete search history.

(56) References Cited

U.S. PATENT DOCUMENTS

| 4,883,524 | A | | 11/1989 | Bristol |
| 5,973,844 | A | * | 10/1999 | Burger ........................ 359/622 |
| 6,305,194 | B1 | * | 10/2001 | Budinski et al. ............... 65/105 |
| 6,721,101 | B2 | * | 4/2004 | Daniell ........................ 359/626 |
| 6,951,119 | B1 | * | 10/2005 | Quenzer et al. ............... 65/102 |
| 2002/0130986 | A1 | * | 9/2002 | Richard ........................ 349/62 |
| 2003/0020399 | A1 | * | 1/2003 | Moller et al. ................ 313/504 |
| 2005/0239228 | A1 | * | 10/2005 | Quenzer et al. ............... 438/29 |

FOREIGN PATENT DOCUMENTS

| DE | 199 56 654 | | 6/2001 |
| DE | 101 18 529 | | 10/2002 |
| JP | 2000241607 A | * | 9/2000 |
| JP | 2001158021 A | * | 6/2001 |
| WO | WO 0138240 A1 | * | 5/2001 |

* cited by examiner

*Primary Examiner*—Khanh Nguyen
*Assistant Examiner*—Keith T Aziz
(74) *Attorney, Agent, or Firm*—Buchanan Ingersoll & Rooney PC

(57) ABSTRACT

Disclosed is a method for producing single microlenses or an arrays of microlenses composed of a glass-type material, in which method a first substrate is provided with a surface containing impressions over which a second substrate composed of a glass-type material is placed at least partially overlapping it and is joined therewith under vacuum conditions. The substrate composite is tempered in such a manner that the second substrate softens and flows into the impressions of the first substrate, thereby structuring the side of the second substrate facing away from the first substrate in order to form at least one microlens surface.

10 Claims, 5 Drawing Sheets

METHOD FOR PRODUCING SINGLE MICROLENSES OR AN ARRAY OF MICROLENSES

This application claims priority under 35 U.S.C. §119 to German Application No. 103 13 889.7, filed Mar. 27, 2003, and under 35 U.S.C §371 to International Application No. PCT/EP2004/002993, filed Mar. 22, 2004, the contents of which are incorporated herein by reference in their entirety.

BACKGROUND

The present invention relates to a method for producing single microlenses or an array of microlenses composed of a glass-type material. According to the method, a first substrate having a surface containing impressions is provided, a second substrate composed of the glass-type material is placed over the first substrate at least partially overlapping it and is joined with the same under vacuum conditions, moreover the substrate composite is tempered in such a manner that the second substrate softens and flows into the impressions in the first substrate thereby structuring the side of the second substrate facing away from the first substrate to form at least one microlens surface.

Furthermore, an alternative method for producing single microlenses or an array of microlenses made of a glass-type material is described in which a first substrate having a surface containing impressions, a second substrate composed of the glass-type material is placed over the first substrate at least partially overlapping it and is joined with the same, with a gaseous medium being enclosed in the impressions between the first substrate and the second substrate and the substrate composite being tempered in such a manner that the second substrate softens and the expanding gaseous medium is displaced in the region of the impressions, thereby structuring the side of the second substrate facing away from the first substrate to form at least one convex microlens surface.

WO 01/38240 A1 describes a method for producing micromechanical and, in particular, microoptical components composed of glass-type materials using technologies to structure semiconductor substrates in order to produce functional elements made of glass in the micrometer and submicrometer range by means of glass-flow processes. In a first step, the impressions, which may be obtained by means of prior art standard lithography and etching methods, are placed in a preferably plane semiconductor surface. The prestructured semiconductor substrate is then joined with a plane substrate composed of a glass-type material, for example by means of anodic bonding, and then heated above the softening temperature of the glass-type material. If a vacuum or low pressure prevails in the cavity enclosed by the respective impression in the semiconductor material and the plane glass-type substrate, parts of the softened glass-type material are able to flow into the cavity. However, if a gaseous medium, for example air, is enclosed in the cavity in which, for example, the plane glass-type substrate is joined with the structured semiconductor substrate under normal pressure conditions, the gaseous medium located in the cavity expands due to tempering and displaces the softened glass-type material located directly over the cavity.

In the first case, a concave shaped microlens structure forms inside the surface of the glass substrate facing the semiconductor substrate. On the other hand, in the second case the local displacement leads to a convex shaped microlens structure. In both cases the resulting curvature of the microlens surface is dependent on the type and duration of tempering but, in particular, on the shape and size of the respective individual impressions inside the semiconductor substrate. With the aid of the prior art method described in the preceding, spherically or elliptically symmetrical microlens surface can be produced.

U.S. Pat. No. 4,883,524 also describes with reference to FIG. 6 shown therein a glass-flow method which determines the shape of a binocular lens, in which local flowing off of the melted glass into a concave impression in the form of an ophthalmic lens of the optical near part of a two-focal lens glass is producible.

SUMMARY

A method is disclosed for producing single microlenses or an array of microlenses composed of a glass-type material in such a manner that the curvature of the lens shape can be practically set as desired. In particular, it should be possible to produce single aspherical lenses or arrays of lenses in a cost-effective as possible manner.

The method according to the present invention is fundamentally based on the technology of the glass-flow method described in WO 01/38240 A1 but, contrary to the prior art method technology for forming a microlens surface, it does not use a single impression per microlens inside the semiconductor substrate but rather provided are at least two impressions, the form, size and arrangement of which in relation to each other determines the shaping process leading to forming the microlens surface on the surface of the glass substrate facing away from the semiconductor substrate and is distinguished by local material displacements to create convex contours or by a controlled, selective material flow into the at least two impressions, respectively cavities, provided in the first substrate to create concave or even convex surface contours.

In a first variant of the method, the first substrate composed of a semiconductor material, preferably present in the form of a monocrystalline silicon wafer and hereinafter referred to as semiconductor substrate, is provided with impressions placed in an otherwise plane upper side of the semiconductor substrate by semiconductor technology means. The size, shape and arrangement of the impressions is based on the desired curvature of the surface of the to-be-produced microlens surfaces as will be described hereinafter. At least two impressions are placed adjacent to each other in the upper side of the semiconductor substrate in such a manner that the impressions remain separated from each other by means of a narrow intermediate fillet, the width of the intermediate fillet being usually dimensioned much smaller than the smallest lateral dimension inside the two adjacent impressions.

The prestructured semiconductor substrate is intimately joined with the second glass-type substrate, hereinafter referred to as glass substrate, under vacuum conditions preferably by means of anodic bonding in such a manner that the glass substrate closes the impressions gas tight to form cavities in which vacuum conditions prevail.

In the following, the substrate composite undergoes a tempering process in which the glass-type material softens and flows locally into the cavities due to the vacuum conditions prevailing in the cavities until the cavities are preferably completely filled with the softened glass-type material.

Providing the size, shape and arrangement of the impressions inside the semiconductor substrate permits preselecting exactly the amount of glass-type material that flows into the cavities formed by the impressions. Due to suited selection of the width of the glass substrate dependent on the prescribed geometry, the material flow directed into the cavities on surface of the semiconductor substrate facing the semiconductor substrate leads to local sinking of the surface occurring in the region in projection over the cavities. The local sinking of the surface ultimately represents a concave surface contour, the local curvature, size and shape of which determines the optically effective surface of a microlens.

Corresponding combination of suitably formed impressions, respectively cavities, and suitably arranged on the surface of the semiconductor substrate with suited selection of thickness of the glass substrate permits reproducible production of microlenses having a defined curvature of the surface, in particular the production of aspherical single lenses, respectively arrays of lenses, using simple technical means which moreover can be realized cost-effectively.

Following the aforedescribed shaping procedure, after cooling of the glass substrate, the semiconductor substrate is separated from the glass substrate and single microlenses or whole arrays of microlenses are obtained by means of polishing, grinding, sawing or similar processes. The separation as such can be simplified by previously providing a separation layer between the semiconductor substrate and the glass substrate, for example by providing a metal, graphite or similar separation layer. The simplest method of separation of the semiconductor and the glass substrate is, however, still dissolving the semiconductor substrate itself wet-chemically.

The invented method does not only permit, as described in the preceding, production of concave microlens surfaces, but also the formation of convex microlens surfaces, for which two fundamentally different alternative method variants are at disposal, which differ essentially in whether vacuum pressure conditions or normal pressure conditions prevail in the cavities before tempering.

If, as described in the preceding, joining the semiconductor substrate with the glass substrate is conducted under vacuum conditions, at least two impressions, respectively cavities, which are separated by a so-called intermediate fillet area have to be placed in the semiconductor substrate surface. The intermediate fillet area rises like a stamp or a island between the at least two impressions, which are arranged separated from each other or can be constructed in such a manner that they completely enclose the intermediate fillet area in the form of a through-going "trough". The lateral extension of the intermediate fillet area is many times larger than the aforedescribed intermediate fillet. A more exact idea of the arrangement of the intermediate fillet area relative to the adjacent impressions is described, in particular, in the following preferred embodiments.

As a result of anodic boning such a type prestructured semiconductor substrate with a glass substrate and subsequently tempering above the softening temperature of the glass-type material, the softened glass-type material over the intermediate fillet area begins to flow into the provided adjacent impressions, thereby yielding a convex surface contour over the intermediate fillet area on the glass-substrate surface facing away from the semiconductor substrate. The curvature behavior of the convex form and its shape and size can be exactly prescribed by the shape, size and arrangement of the impressions about the corresponding intermediate fillet area and its dimensions. Further details on this described variant of the method are determined in the further description with reference to the preferred embodiment.

The second alternative of the method for producing convex lens surfaces provides joining the semiconductor substrate with the glass substrate under normal pressure conditions in such a manner that a gaseous medium, for example air, which expands upon heating is enclosed in the cavities provided by the impressions. The temperature-dependent expansion of the gaseous medium inside the cavities displaces locally the softened glass material directly over the cavities in such a manner that convex bulges are yielded on the surface of the glass substrate facing away from the semiconductor substrate. The curvature of the bulges can be prescribed, in the same manner, by the shape, size and arrangement of the cavities/impressions placed on the semiconductor substrate.

In addition to being able to determine the surface curvature forming on the upper side of the glass substrate facing away from the semiconductor substrate by means of the aforedescribed shaping process, the shape, size and arrangement of the impressions, respectively cavities, inside the semiconductor substrate can also determine the lateral extension and the peripheral contour of the microlens forming on the upper side of the glass substrate.

Independent of the variant of the method for producing convex or concave surface contours described in the preceding it is especially advantageous for precise delimiting, respectively setting, of the peripheral edge is placing a additional semiconductor substrate, which provides recesses, preferably in the form of openings, adapted according to the desired peripheral geometry of the to-be-produced microlenses on the upper side of the glass substrate facing away from the structured semiconductor substrate. The openings inside the additional semiconductor substrate are aligned to lie opposite according to the arrangement of the impressions in the first semiconductor substrate before the second semiconductor substrate is joined with the surface of the glass substrate by means of anodic bonding. The otherwise flat joining of the glass substrate and the additional semiconductor substrate is also retained during the tempering, which leads to softening the glass substrate.

In the case of a convex as well as of a concave forming microlens surface, the linear nature of the delimiting edge circumventing the microlens surface, which is determined by the opening in the additional semiconductor substrate, is not influenced, thereby permitting precise determination of the peripheral edge of the forming microlens.

As mentioned in the preceding, the invented method permits producing microlenses with almost any desired curved lens surfaces, preferably aspherical lens surfaces with dimensions ranging from a few micrometers up to 1 mm and more. Such type lenses can have almost any desired peripheral contour, preferably circular or rectangular lens shapes.

In addition to producing single microlenses, the invented method, however, is also suited for producing array-like arranged lenses, as they are used, in particular, in microsystem technology, for example, for optical imaging on CCD array arrangements.

After completion of the aforedescribed tempering and the following corresponding cooling for solidifying the glass substrate, the semiconductor substrates can be removed, for example by means of as such known etching, from both sides of the surfaces of the glass substrate. Alternative technologies, such as for example, grinding off can also be employed. In particular, the aim is to separate the substrate with the glass-filled impressions from the glass substrate to create a plane surface. Depending on the use, the microlenses, respectively the arrays of microlenses, produced by means of the aforedescribed manner can be detached or selected in an array-like arrangement by means of cutting or grinding processes.

BRIEF DESCRIPTION OF THE DRAWINGS

The present invention is described in the following using preferred embodiments with reference to the accompanying drawings without the intention of limiting the scope or spirit of the overall inventive idea. Depicted is in.

DETAILED DESCRIPTION

Figure 1:
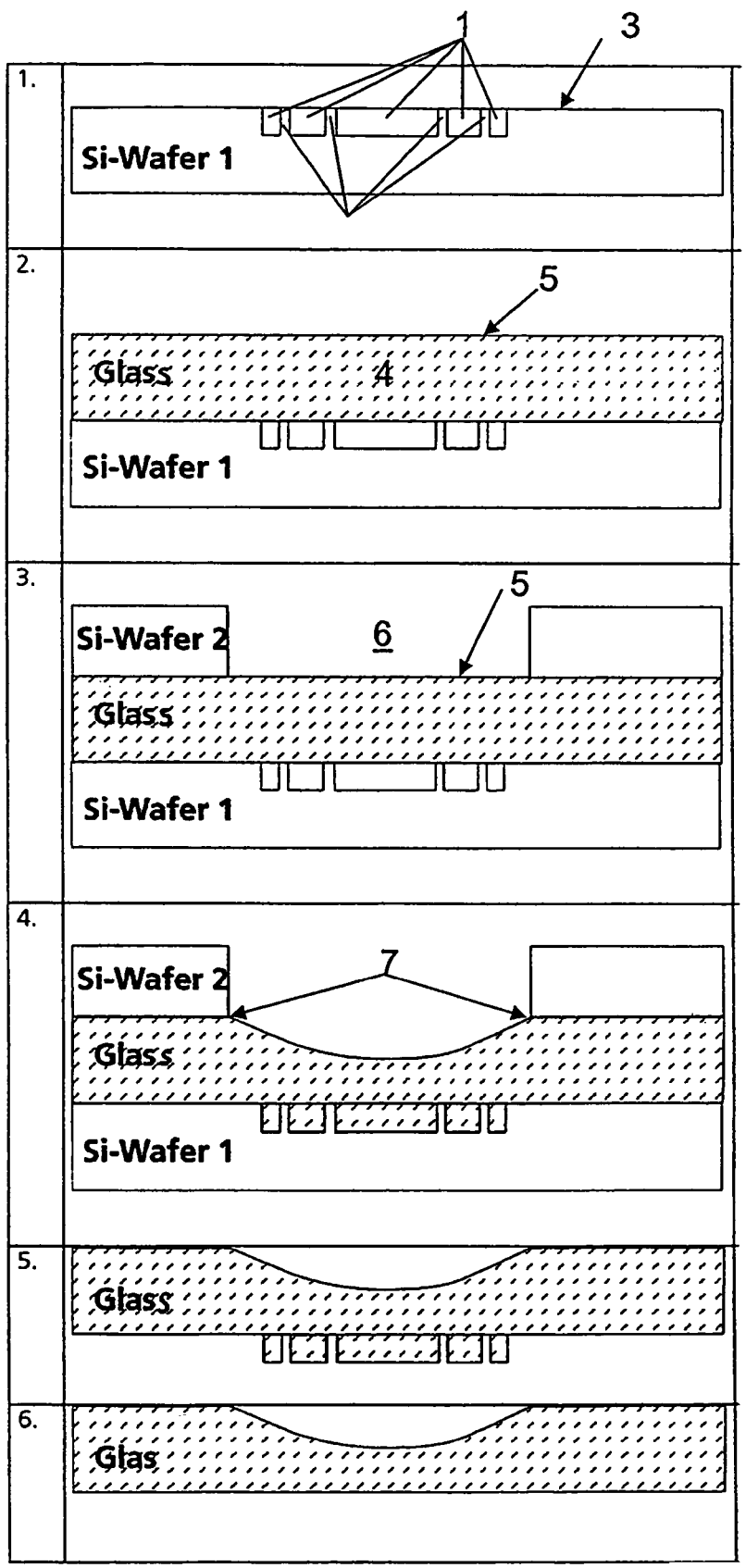
FIG. 1 process steps for producing a concave shaped microlens.

FIG. 1 shows six process steps with which a microlens with a concave lens surface can be produced. In a first process step the aim is to provide a base substrate composed of a semiconductor material, which preferably comprises a monocrystalline silicon and is referred to hereinafter as silicon wafer 1, having structures in the form of impressions 1, which can be placed in the surface of the silicon wafer 1, for example by means of an etching process, such as dry etching. As described in detail in the following, the shape, size and arrangement of the impressions 1 is of decisive significance for the ultimately forming surface curvature and shape of the microlens. The impressions 1 placed in the surface of the silicon wafer 1 according to the preferred embodiment of FIG. 1 have a wide central impression adjacent to each side of which are additional impressions at increasingly smaller lateral distances. Each single impression is delimited from the adjacent impression by a narrow intermediate fillet 2. Depending on the to-be-produced curvature of the lens surface, the shape, size, and arrangement of the single impressions 1 can deviate from the impressions shown in FIG. 1.

In the subsequent process step, the surface 3 of silicon wafer 1 provided with the impressions 1 is joined with a substrate composed of a glass-type material, for example a glass wafer 4 composed of pyrex glass or borofloat glass under vacuum conditions by means of anodic bonding. Alternative joining techniques, such as for example gluing techniques, can of course also be utilized to join the glass wafer 4 with the silicon wafer 1 if the used joining technique is able to withstand the required high process temperatures.

The upper side 5 of glass wafer 4 facing away from the silicon wafer 1 is joined with another silicon wafer 2, preferably also utilizing anodic bonding, with the silicon wafer 2 having a recess 6, the shape and size of which is matched to the arrangement of the impressions 1 inside the silicon wafer 1 and is aligned correspondingly opposite it on the upper side 5 of the glass wafer 4.

In a subsequent tempering process, which is shown in process step 4, the glass-type material of the glass wafer 4 softens and flows into the cavities determined by the impressions 1 and fills them completely as indicated in the process step 4. The flow process of the softened glass-type material into the cavities determined by the impressions 1 is supported by the vacuum prevailing in the cavities. The shape, size and arrangement of the cavities in the silicon wafer 1 can selectively set the amount of glass that flows into the cavities. With corresponding selection of the thickness of the glass wafer 4, due to the aforedescribed flowing of the glass-type material into the cavities, a local sinking of material occurs, developing exactly inside the opening 6 of the silicon wafer 2. The linear delimiting edge 7 determined by the opening 6 in the silicon wafer 2 determines the geometry of the developing microlens, whose surface is formed by the sinking of the softened glass-type material and is described in process step 4 according to FIG. 1.

In addition to the vacuum enclosed inside the cavities, the material sinking in the softened glass-type material can be supported by tempering conducted under normal conditions, preferably 1 bar, in such a manner that the cavities determined by the impressions 1 are completely filled with the corresponding softened glass material. In this manner, the whole volume of the glass material that flowed into the cavities is exactly predetermined by the volume prescribed by the impressions 1 in order to ultimately obtain a certain curvature on the upper side 5 of the glass substrate 4 by means of the material sinking. However, the cavities defined by the impressions 1 must not exceed a maximum size, respectively expansion, with the geometry and the arrangement of the impressions ultimately being dependent on the selected thickness of the glass wafer 4. Thus, the form of the impressions 1, the selected thickness and density of the glass material of glass wafer 4 and the selected tempering conditions determine the different flow behavior and the resulting curvatures and shapes on the glass surface 5 of the glass wafer 4.

Following the shaping of the glass material by means of tempering and its subsequent cooling, the silicon wafers 1 and 2 are removed from the glass substrate 4. In the simplest case, this occurs by means of wet-chemical etching. Finally, the bottom side of the glass wafer has to be leveled, for example by means of grinding and subsequent polishing of the surface. See process steps 5 and 6 in FIG. 1.

Corresponding separation layers can also be provided between the surfaces of the glass substrate 4 and the silicon wafers 1 and 2, for example metals that melt at low temperatures or a graphite layer, thus even permitting separating the silicon wafers from the surfaces of the glass substrate 4 without the conventional etching techniques.

The method presented with reference to FIG. 1 permits producing microlenses having defined concave shaped surface curvatures with a very high degree of reproducibility.

To produce arrays of lenses distributed over an area, the silicon wafer 1 has to be prestructured array-like with the respective impressions 1 required for forming the desired microlenses. The process steps for producing suited arrays of lenses following suited prestructuring correspond to the process steps 2 to 6 according to the aforedescribed FIG. 1.

Figure 2:
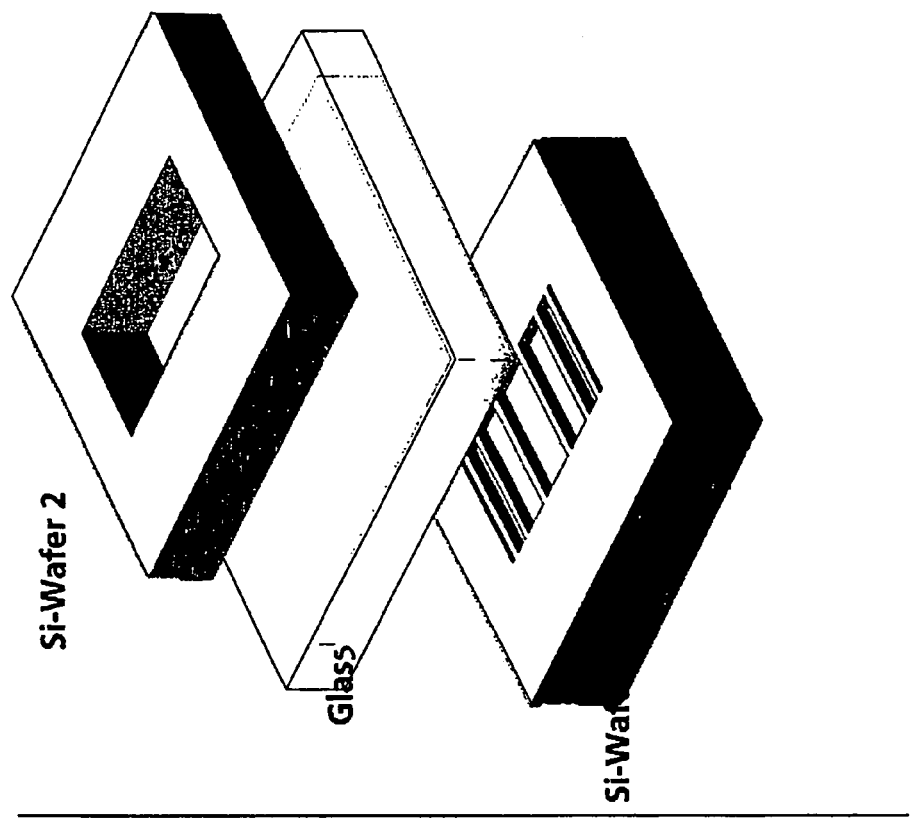
FIGS. 2a,b a three-dimensional representation for structuring suited semiconductor substrates for producing a convex round lens (a) and a cylindrical rectangular lens (b), FIG. 3 a variant of the method according to FIG. 1, FIGS. 4a,b process steps for producing a convex shaped microlens, FIG. 5 a three-dimensional representation of a layer arrangement for producing a convex shaped microlens, FIG. 6 a process step representation for producing a convex shaped microlens by means of material displacement and FIG. 7 a variant of the method for producing a convex shaped microlens for the process step according to FIG. 4.
Figure 2:
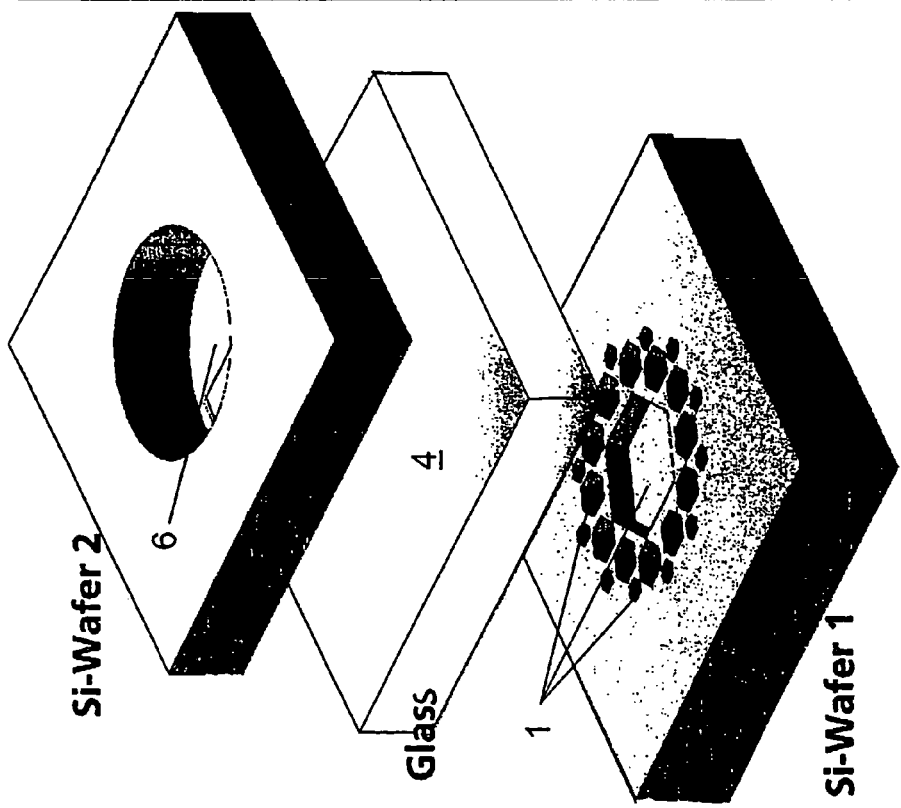

FIGS. 2a and b show a three-dimensional representation of the layer structure, which fundamentally corresponds to the process course depicted in FIG. 1. To produce a round microlens, FIG. 2a shows a silicon wafer 1 whose surface is provided with a multiplicity of symmetrically arranged sexagonal prismatic impressions 1. Arranged in a ring around a central, largest sexagonal impression, are a multiplicity of smaller sexagonal impressions which for their part are also depending on the curvature behavior of the to-be-produced microlenses, impressions of various shapes, geometries and arrangements can be selected, thus the structured silicon wafer 1 shown in FIG. 2a is only a concrete case example. Provided over the prestructured silicon wafer 1 is a glass wafer 4 over which for its part is shown a silicon wafer 2 provided with an opening 6. The opening 6 defines the circular edge of the microlens surface yielded by means of tempering as described in the preceding, in particular, with reference to FIG. 1 process step 4.

Furthermore, the invented method also permits producing microlenses with a peripheral boundary which deviates from a circle, such as for example is the case with cylindrical lenses. For this purpose, the silicon wafer 1 shown in FIG. 2*b* is provided with a multiplicity of rectangular-shaped impressions 1 arranged side by side and separated by intermediate fillets in the manner shown in FIG. 2*b*. Adapted to the overall basic form prescribed by the structured wafer 1, the silicon wafer 2 is provided with a corresponding rectangular opening which for its part determines the delimiting edge of the microlens surface forming by means of tempering.

The structuring possibilities of the substrate surface of the silicon wafer 1 shown in FIGS. 2*a* and 2*b* are only representative case examples for forming circular or rectangular-shaped microlenses and fundamentally permit concluding that with the aid of the invented method microlenses of practically any desired shape can be produced.

Figure 3:
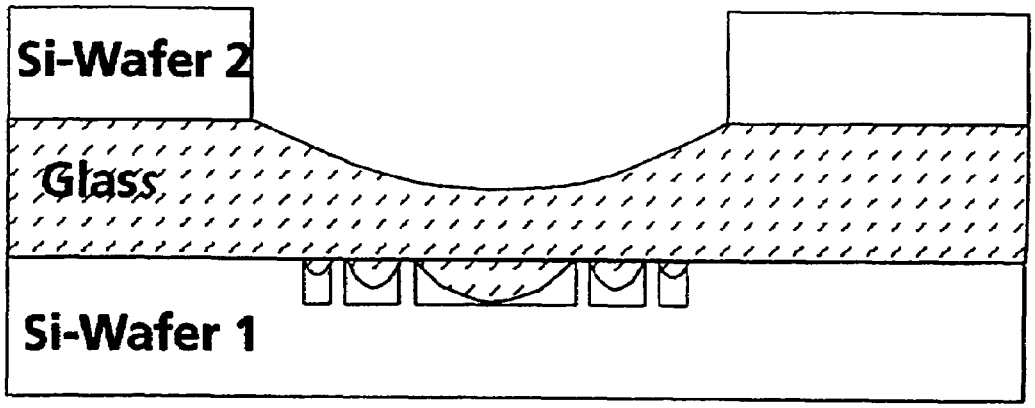

FIG. 3 shows a variant of the method for the process step shown in FIG. 1 process step 4. In contrast to FIG. 1, the cavities represented by the impressions 1 are only partially filled with softened material. Such a type variant of the method is suited, in particular, in cases in which the tempering is monitored by a time-dependent tempering control thereby enabling monitoring and correspondingly setting the curvature behavior of the lens surface developing locally at the surface 6 of the glass substrate 4.

The process situation described in the preceding figures permits producing concave curved microlens surfaces. For producing convex microlens surfaces, there are fundamentally two methods available, of which the first is described in FIGS. 4 and 5 and the second in FIG. 6.

Figure 4:
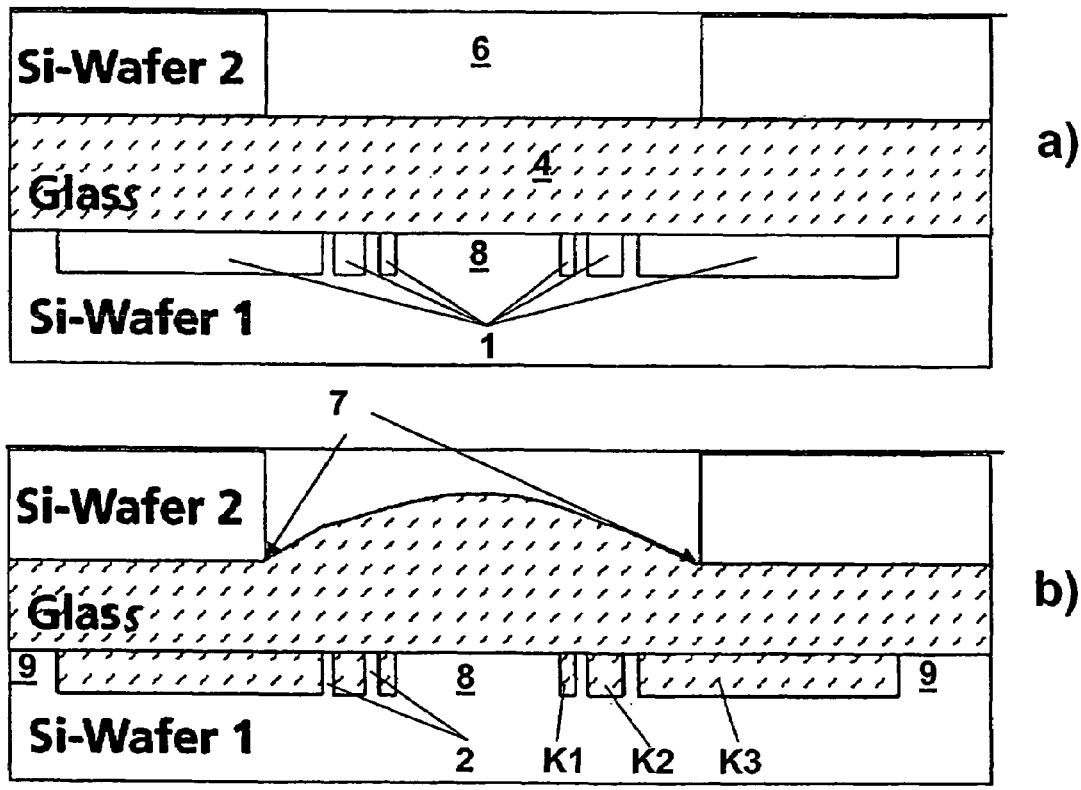

FIG. 4*a* shows a cross section of a joining structure comprising the silicon wafer 1, the glass substrate 4 and the silicon wafer 2. Of decisive significance for the further process steps is the structuring of the silicon wafer 1, i.e. the arrangement of the impressions 1 on the surface of the silicon wafer 1 into which, during the following tempering process, the softened glass-type material flows to form a single convex microlens surface. The structured silicon wafer 1 is provided with a intermediate fillet area 8 which is bordered on both sides directly adjoining by a number of impressions 1. The single impressions are each separated from each other by intermediate fillets 2 whose lateral dimensions are much smaller than the lateral extension of the intermediate fillet area 8. In the shown example, directly adjoining the intermediate fillet area 8 on both sides are in three cavities K1, K2, and K3, respectively, determined by the impressions, with the cavities K3 having the largest lateral width and therefore offer the largest volume for receiving the glass-type material, which in a softened state is flowable. The layer buildup depicted in FIG. 4 is also subjected to the process step 2 in FIG. 1 in such a manner that joining between the glass substrate and the silicon wafer 1 was conducted under vacuum conditions in such a manner that vacuum conditions prevail in the cavities K1, K2, K3. A sealing edge 9 surrounding the cavities K3 on both sides ensures that vacuum conditions are maintained in the cavities K3 during the tempering process.

The opening 6 placed in silicon wafer 2 is preferably positioned symmetrically over the intermediate fillet area 8 in such a manner that in projection, the delimiting edge 7 determined by the opening 6 lies over the cavities of the silicon wafer 1.

FIG. 4*b* shows the outcome of the substrate layer buildup following the tempering process, in which the cavities K1-K3 are completely filled with the glass-type material. Moreover, the silicon wafer 2 has sunk in relation to the silicon wafer 1 as a consequence of the material flow into the cavities, with a convex shaped surface contour forming in the area of the opening 6 as the microlens surface, which ultimately occurs due to the selective provision of the intermediate fillet area 8 arranged in the center in relation to the opening 6, which prevents sinking of the softened glass-type material. But rather a lateral flowing off of the softened glass-type material into the cavities K1-K3 occurs, which are disposed adjacent to the intermediate fillet area 8.

Figure 5:
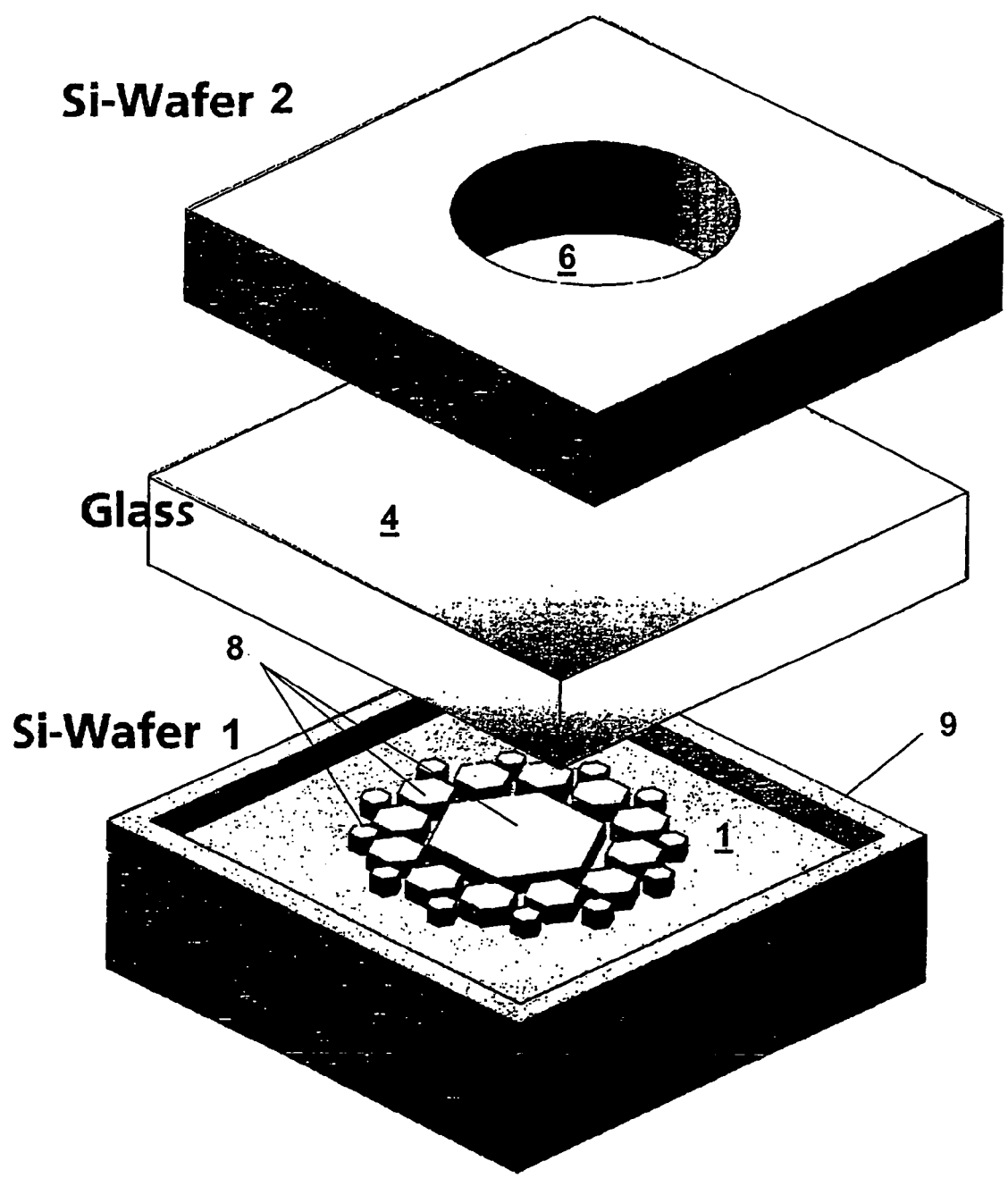

FIG. 5 shows a three-dimensional representation of the wafer required for successfully conducting the afore-described method for producing convex microlens surfaces. The silicon wafer 1 is provided with a surrounding fillet-like border 9, which as described in FIG. 4, serves to maintain the vacuum conditions. Provided within the surrounding border 9 are differently dimensioned intermediate fillet areas 8 serving in their entirety to form a convex microlens surface. In the shown preferred embodiment, the differently dimensioned intermediate fillet areas 8 rise stamp-like or island-like from the bottom of the impression enclosed by the border 9. In FIG. 5, the impression is basically a large area rectangular recess in the surface of the silicon wafer 1, which is surrounded by the border 9 and in whose interior single islands protrude upward.

Glass wafer 4 is joined with the prestructured silicon wafer 1 under vacuum conditions by means of anodic bonding. Occurring in the same manner is the close joining of the silicon wafer 2, provided with an opening 6, to the surface of the substrate 4, with the opening 6 being disposed in the center over the intermediate fillet areas 8 of the silicon wafer 1.

The glass-type material of the glass substrate 4 softening by means of the tempering process flows into the intermediate areas formed by the intermediate fillet areas 8, thereby ultimately yielding inside the opening 6 at the surface 5 of the glass substrate 4 a convex-shaped surface contour.

Figure 6:
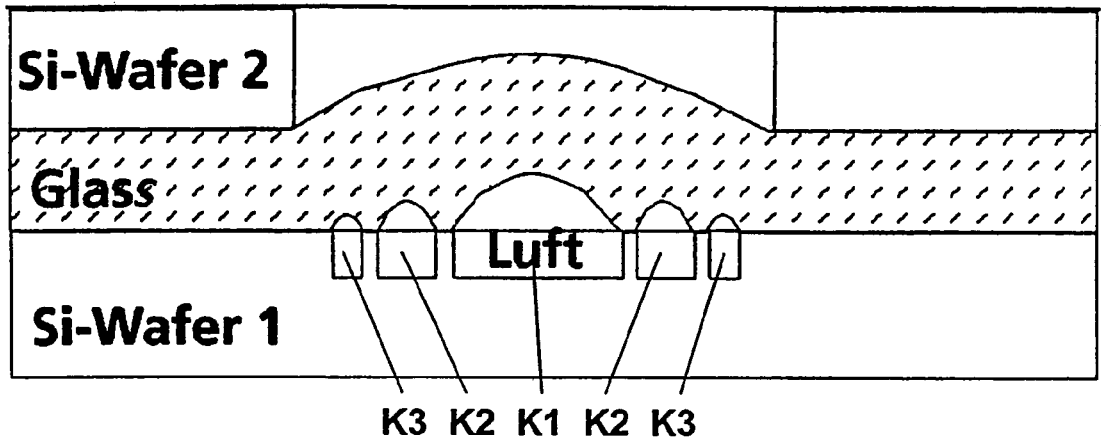

FIG. 6 describes another possible manner of forming convex microlens surfaces. The point of departure is, as in the process step 1 with reference to FIG. 1, the provision of a prestructured silicon wafer 1 having impressions 1 placed therein. In contrast to the method according to FIG. 1, the anodic bonding of the glass wafer 4 with the silicon wafer 1 does not occur under vacuum but under normal pressure conditions so that the cavities K1, K2, K3 formed by the impressions 1 resulting in encapsulating gas, preferably in the form of air, which expands when heated. In the subsequent tempering procedure, corresponding to FIG. 6, the glass-type material softens, with the air present in the cavities K1, K2, K3 expanding simultaneously, which leads to displacement as depicted in FIG. 6. Depending on the size of the cavities, glass-type material over the cavities is displaced upward corresponding to the air portion to form a convex shaped lens surface. Depending on the selection of the size and arrangement of the cavities K1,K2,K3 relative to the opening 6 of the silicon wafer 2, almost any desired shaped convex lens surface curvatures can be created.

Figure 7:
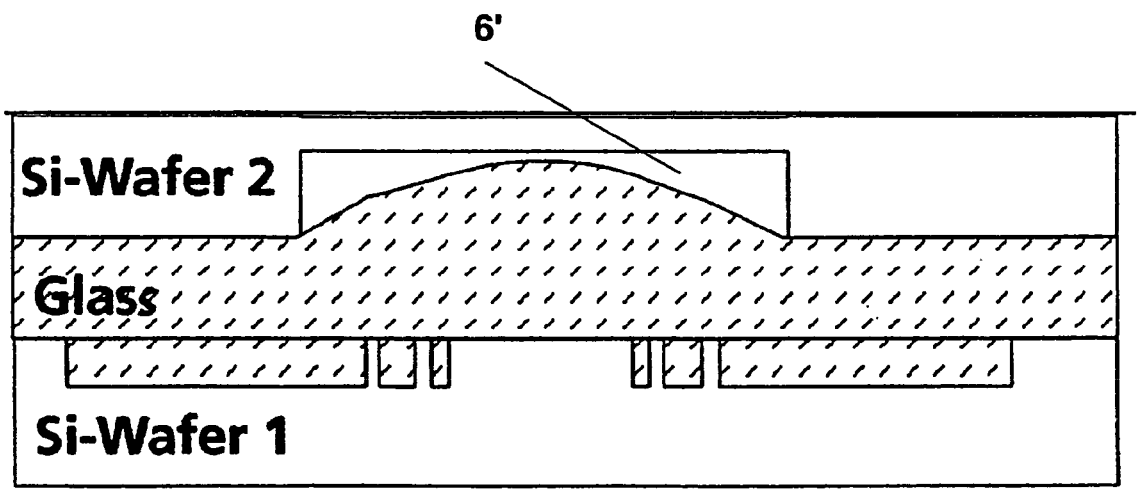

Finally FIG. 7 shows an alternative embodiment for forming the silicon wafer 2, which in contrast to the preceding embodiments, does not provide a through-going opening 6 but just an impression 6' which together with the surface 5 of the glass substrate 4 encloses a volume space. Certain pressure levels can be set inside the volume, for example to further influence the surface of the lens.

With the aid of the invented method, any desired aspherical lens surfaces, be it convex or concave formed microlens surfaces, can be reproducibly fabricated. The described method variants permit realizing simple to conduct process steps cost-effectively, thereby making extremely cost-effective production of such type microlenses or microlens arrays possible.

Finally, it must be pointed out that the invented method can be utilized just as successfully for producing microlenses or microlens arrays made of plastic polymers. The term glass-type material is to be understood that the material has a temperature at which the material softens, at which the material transcends into a viscous, flowing state.

In a particular further embodiment variant, the microlenses, respectively the microlens arrays, obtained with this method can be utilized as replication structures, respectively master molds, for fabricating microlenses, respectively microlens arrays, with exact predetermined lens surfaces, for example within the scope of casting. Furthermore, the obtained lens surface contours can be transferred by means of galvanic casting to more robust matrix substrates, for example Ni-matrixes, which serve for further replication of microlens forms.

LIST OF REFERENCES 1 impressions
2 intermediate fillets
3 surface of the silicon wafer
4 glass substrate
5 surface of the glass substrate
6 opening
7 delimiting edge
8 intermediate fillet area
9 surrounding border

What is claimed is:

1. A method for producing single microlenses or an array of microlenses composed of glass, the method comprising:
   providing a first substrate with a surface containing impressions over which a second substrate composed of glass is placed at least partially overlapping it and is joined therewith under vacuum conditions, and
   pempering the substrate composite in such a manner that the second substrate softens and flows into the impressions of the first substrate, thereby structuring the side of the second substrate facing away from the first substrate in order to form at least one microlens surface, wherein for forming each microlens surface, the softened glass of the second substrate flows into at least two impressions of the first substrate, the shape, size, and arrangements of the two impressions determining the curvature of the microlens surface.

2. A method according to claim 1, wherein a first substrate is provided containing a first impression into which said softened glass flows during the tempering to form a concave surface contour at the microlens surface opposite the first substrate and wherein provided beside the first impression and separated by an intermediate fillet is a second impression into which an amount, which is determinable, of the softened glass flows determined by the shape, size and arrangement of the second impression to form a prescribed curvature of the microlens surface in at least a subdomain of the concave surface contour.

3. A method according to claim 1, wherein the first substrate contains at least two impressions separated by an intermediate fillet area over which a convex surface contour forms at the microlens surface opposite the first substrate due to the lateral flowing off of the softened glass into the at least two impressions during the tempering.

4. A method according to claim 1, wherein a metal layer is placed between the first and the second substrate.

5. A method according to claim 1, wherein the structured surface of the first substrate is provided with impressions having structure widths B and the second substrate having a thickness D and wherein the following applies approximately:

$$B<0.5*D.$$

6. A method according to claim 1, wherein the first substrate is a semiconductor substrate and/or wherein the glass is a borosilicate glass.

7. A method according to claim 1, wherein the first substrate is a semiconductor substrate and/or wherein the glass is a polymer-based plastic material.

8. A method according to claim 1, wherein joining of the first substrate with the second substrate composed of glass occurs by anodic bonding or by a gluing method.

9. A method according to claim 1, wherein the tempering is conducted by controlling the temperature and the duration to obtain a certain curvature of the forming microlens surface.

10. A method according to claim 1, wherein before the tempering, a third substrate is placed on the side of the second substrate facing away from said first substrate, and wherein the third substrate is provided with at least one impression or at least one opening having a delimiting contour, which delimits the peripheral contour of the forming microlens.

* * * * *